July 20, 1926.

J. SHAW 1,592,908

MOTION PICTURE IN COLOR

Filed May 3, 1921      2 Sheets-Sheet 1

INVENTOR
Joseph Shaw
BY
Emery Varney Blair & Noguet
ATTORNEYS

July 20, 1926. 1,592,908
J. SHAW
MOTION PICTURE IN COLOR
Filed May 3, 1921 2 Sheets-Sheet 2

INVENTOR
Joseph Shaw
BY
Emery Varney Blair & Hoguet
ATTORNEYS

Patented July 20, 1926.

1,592,908

UNITED STATES PATENT OFFICE.

JOSEPH SHAW, OF NEW YORK, N. Y.

MOTION PICTURE IN COLOR.

Application filed May 3, 1921. Serial No. 466,428.

This invention relates to color photography and has for an object to provide an improved method of printing projection positives.

The invention is conceived to be more particularly applicable to the printing on opposite sides of a motion picture film sensitized on both sides, images of complementary color selected value. The invention, therefore, will be described with respect to such an application thereof, although obviously certain features of the invention are capable of more general application.

The invention provides a method of printing by optical means upon a film sensitized on both sides from a negative film having images of different color selected value on successive image areas of said negative. In accordance with the invention, images of different color selection, preferably substantially complementary color selected value, which appear in the negative upon successive image areas, are printed in superposed registered relation upon opposite sides of the double sensitized film to provide a positive, having in each image area, but on opposite sides of the film, images of different color selection or substantially complementary color selected valve, which may be suitably colored to provide a transparency for color projection purposes.

The optical method of printing is preferred to contact methods for the reason that it is necessary ordinarily in one printing operation to print through the support of the negative film and in the other operation, when the negative is reversed, it is necessary to print directly through the gelatine or emulsion bearing side of the film onto the double coated sensitized film. In contact printing, the thickness of the film support will not permit the same perfection of image sharpness as is obtained when printing the other image from the emulsion side of the negative, whereas by optical printing the factor of support thickness becomes negligible.

The invention provides a method of printing employing lens means only between the negative and the positive during the printing operation and avoids the interposition in the path of the light rays of other optical means such as prisms, mirrors and the like, so commonly employed in optical methods of printing.

The invention will be best understood from a detailed description of a specific method of printing in accordance with the invention, reference being had to the accompanying drawings forming a part thereof and in which, Figure 1 is a diagrammatic sectional view taken axially of the film gates of a printing machine, which may be employed in practicing the invention.

Figure 5:
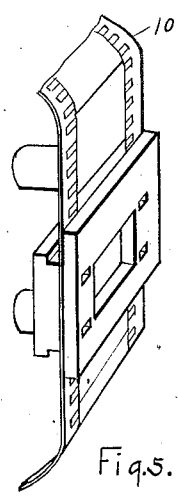
Figs. 5 and 6 are perspective views of the positive film gate, shown turned to indicate the two printing positions.
Figures 1, 3:
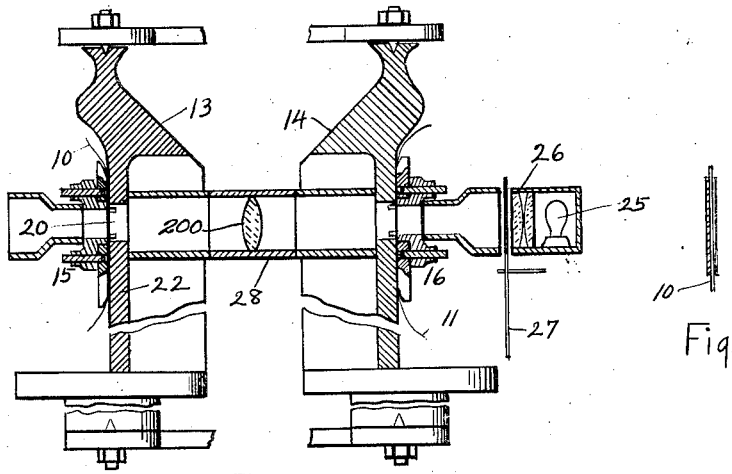
Figs. 3 and 4 are sectional views of a double coated positive having sensitive coatings on both sides corresponding to the portions of the positive film as held in the film gate in Figs. 1 and 2, respectively.
Figure 6:
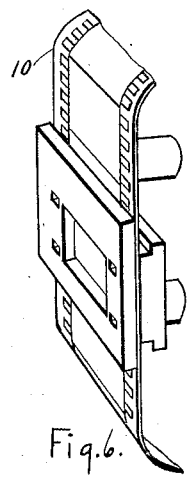
Figures 2, 4:
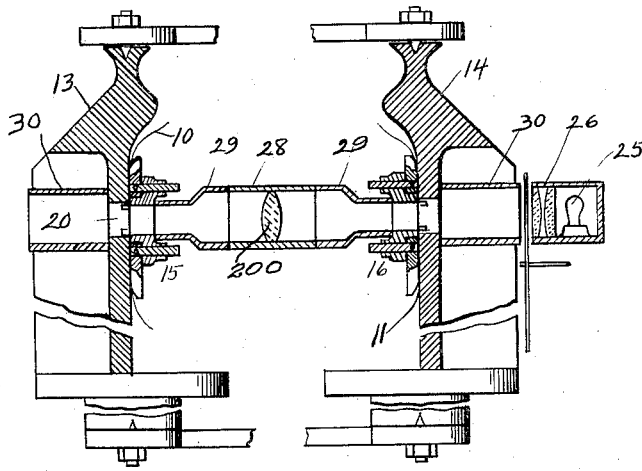
Fig. 2 is a similar view showing the film gates turned at an angle of 180 degrees from the position shown in Fig. 1.
Figure 7:
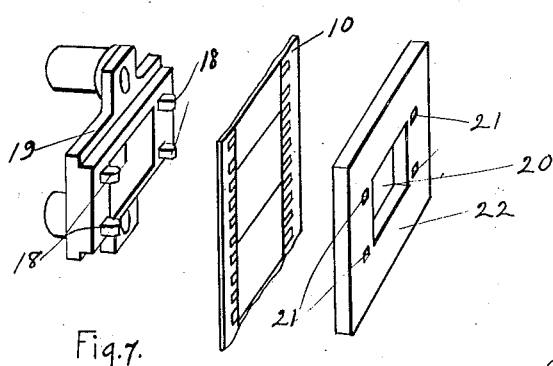
Fig. 7 is a detail perspective view of the film gate showing the position and relation of the positioning pins and the position of the film, the parts being shown as spaced for clearness of disclosure.

In the method of printing, more particularly to be described for the purposes of illustrating the invention, a positive film 10 sensitized on both sides is printed from a negative 11 having on one side thereof a series of images representing successive phases of action and in which the successive images are alternately of red and green color selected value. For convenience of description, the term "pair of images" will be employed to indicate two successive images, one of red color selected value and one of green color selected value, which two images are imprinted in registry in superposed relation in the positive. The two images combine to form in each area a composite image for projection. The method of printing is the same whether the successive images, that is to say, one image of red color selected value and one image of green color selected value represent the same or successive phases of action. In carrying out the process of the present invention, the two images of each pair are printed preferably in congruent superposed relation upon opposite sides of the positive 10. But it is essential to the production of a satisfactory color projection positive, that the two images shall be in accurate registry, one with another. The films conveniently may be supported in printing heads 13, 14, rotatable on vertical axes as indicated in Figures 1 and 2. To insure such accurate registry, the positive and negative, more particularly the negative, are accurately registered in the corresponding film gates 15 and 16. An exposure is made to print from one negative image upon one side of the positive film, the two film gates are then rotated through an angle of 180 degrees and the negative film is advanced one step to bring the second negative image of the same pair into printing position and a second exposure is made to print said second image upon the opposite side of the positive. It is noted that in this operation of printing of the pair of images on opposite sides of the positive, the positive film may be and preferably is retained clamped in the same stationary position in its film gate for two successive printings. Wherefore, no element of inaccuracy is introduced by any possible movement of the positive film with respect to its film gate, until the two separate images comprising a "pair" are printed in registry upon opposite sides of the positive film.

The negative 11, however, is advanced between the two successive printings and therefore it is necessary to provide means for accurate positioning of the negative both laterally and vertically with respect to the printing aperture for each printing. Preferably similar means for accurate registry of the two films are provided in both positive and negative film gates. In the apparatus illustrated, the construction of the film gates, including the guiding and registering means, is similar. The construction of the positive carrying film gate only will be described. I provide means for engaging the four film perforations on the four corners of each image area. It will be understood that the taking camera should preferably, but not necessarily, be provided with similar devices for registering the negative film during exposure with respect to the same perforations. As shown, the registering devices comprise four pilot pins 18, 18, carried by the pressure plate 19, which are arranged at the printing aperture 20 to engage the four perforations of the film at the four corners of each image area. The pins in operation project through four perforations in the film and enter four corresponding recesses 21, 21, in the back plate 22 of the film runway in which the pins fit closely to insure accurate positioning of the film. The pilot pins are preferably so constructed and arranged that they engage the outermost edges of all four perforations so as to have the effect of holding the film relatively taut, thus holding the film taut and flat over the printing aperture and centering it with respect to said four perforations. This is an important feature of the invention as it affords the necessary flatness of the film and insures accuracy of registration and focus. By this arrangement, the effects of any possible distortion of the film or any possible inaccuracy of the size or positions of perforations will be averaged as distinguished from a construction in which the position of an image area is determined either entirely or in one direction, by a single pilot pin, engaging a single perforation. The pins register the film in both lateral and longitudinal directions. It will be obvious that if an image area is registered in one direction or in both directions with respect to one perforation only, the least imperfection or inaccuracy in the position or shape of a perforation, or the least warping of the film, will cause a correspondingly full measure of inaccuracy in the positioning of the image area, whereas, in the registration of each image area with respect to the four perforations at the four corners of the film, a compromise will be obtained. While the pilot pins are fixedly secured in the film gate, they can be easily removed and replaced. This makes it convenient at times if necessary to replace the set of four pins by another set of smaller dimension, when printing from an old negative film which has shrunk due to its age.

In the construction illustrated, the several pilot pins are made substantially the full size of the perforations of the respective films and are positioned accordingly to receive the corresponding film and engage the four corners thereof, as aforesaid. The negative film, ordinarily, is slightly smaller than the positive film, due to the contraction which generally occurs upon development and drying. Due allowance is made for this difference, as by making the pilot pins of the negative gate slightly smaller. A suitable focusing lens 200 is suitably supported intermediate the two film gates. A suitable source of light is provided at 25 for illuminating the negative film. Condensers may be introduced as indicated at 26. Arrangement is made for adjusting the intensity of this light to provide different intensities, one for printing the images of red color selected value and one for printing the images of green color selected value, which may be varied as desired. Any suitable means also may be provided for causing the intensity of the light to be changed alternately as the film gate turns to print first an image of red color selected value and then an image of green color selected value. A suitable shutter 27 obscures the light during the film movements. Light tight tubes are conveniently illustrated surrounding the lens as indicated at 28 and extending to opposite sides from the film gate as indicated at 29 and 30.

These tubes are so fitted and adjusted that as film gates come into printing position, substantially light tight joints are formed between the several tubes.

Any suitable means may be provided for manually or automatically rotating or oscillating the printing heads to position for successive printings. Suitable mechanism is arranged, for example, to rotate the heads to the position indicated in Fig. 1 to print on one side of the positive an image of red color selected value and then to rotate both printing heads through an angle of 180 degrees to the position indicated in Fig. 2 to print an image of green color selected value upon the opposite side of the same image area of the positive.

Figure 8:
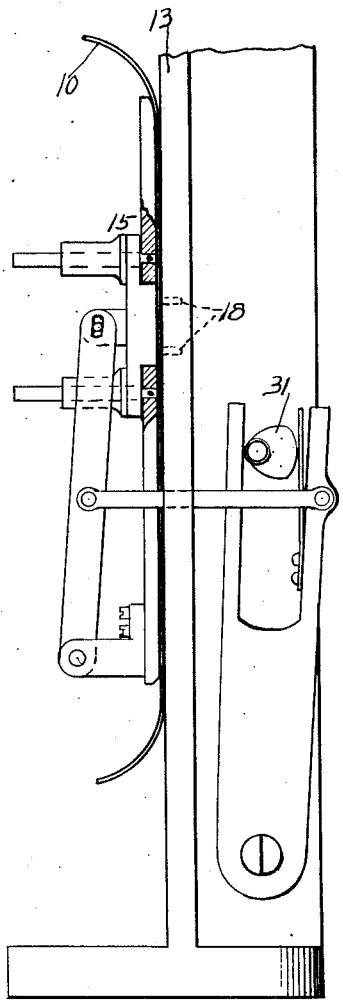
Figs. 8 and 9 are detail views showing diagrammatically pin operating means.
Figure 9:
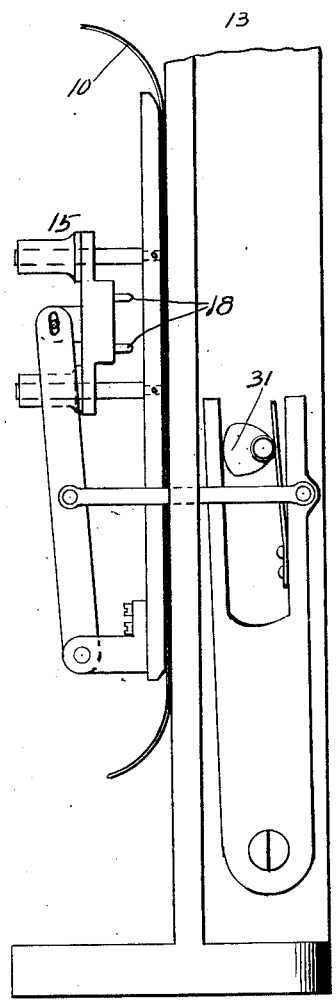

Suitable mechanism is also provided for feeding the film and for operating the pilot pins to withdraw the same during the feeding movement of the film and to project the same into the film perforations to hold the film during printing. A cam mechanism is conventionally indicated at 31, in Figs. 8 and 9, for this purpose.

The images of color selected value are suitably colored in suitable colors to obtain the final projection positive ready for use, as will be well understood by those skilled in the art.

The described method of practicing the invention is illustrative only and should not be understood as limiting the scope of the invention.

I claim as my invention:

1. The method of printing from a motion picture negative having images of complementary color selected value upon a film sensitized on both sides to produce a projection positive, having superposed, registered, congruent images of two different color selected values, which comprises registering a film sensitized on both sides by means of four pilot pins at the printing aperture engaging perforations in the four corners of an image area of the aperture, registering each image area of the negative film by means of four positioning pins at the negative printing aperture engaging perforations in the four corners of the image area, printing by projection an image of the negative upon one side of the double sensitized film, reversing the double sensitized film and the negative film, while retaining the double sensitized film clamped in its printing gate, advancing the negative film to present a second image area at the printing gate, registering said image area by means of said pins, engaging perforations in the four corners of such image area and printing by projection an image from said second negative area upon the opposite side of the positive and in registry with the first printed image.

2. The method of printing from a motion picture negative having images of complementary color selected value, upon a film to produce a projection positive having superposed registered congruent images of different color selected value, which comprises registering a motion picture negative film by means of four pilot pins at the printing aperture engaging the radially outward edges of the four perforations in the four corners of an image area, printing by projection an image of the negative upon the positive, advancing the negative to present a second image area, registering that second image area by means of the four pilot pins engaging the radially outward edges of four perforations at the four corners of the image area, and printing upon the positive the image of said second image area.

3. A photographic projection positive, bearing on opposite sides thereof a series of suitably registered images of complementary color selected value of the same object, each image being registered with respect to the perforations at the four corners of the image area as a basis of reference.

4. A colored motion picture projection positive, bearing superposed congruent images of different color selected values and correspondingly colored, said images being registered with each other with relation to an average of the positions of four perforations at the four corners of each image area as a basis of reference.

5. The method of printing by projection in registry, on a continuous length of motion picture film, composite projection positive images, each comprising one image of one color selection registering with its perforations in superposed relation with another image of another color selection, comprising the steps of successively imprinting in registry the two separate images, while holding the film by means of registering means at the printing aperture consisting of four positioning pilot pins engaging the radially outward edges of four perforations at the four corners of the image area, the pins remaining in the perforations in a state of rest for the full period of the two successive printings comprising the composite image.

6. The step in printing, by projection, registered color motion picture composite images upon a double coated perforated light sensitive medium, each composite image consisting of one image of one color selection on one side in registry with another image of another color selection on the opposite side of the medium, characterized by holding the medium clamped in exactly the same position in the printing aperture for two successive printings of the two separate images and registering these images by means of four positioning pilot pins at the printing aperture, engaging the radially outward edges of four perforations at the four corners of the image area, the pins remaining in these perforations in a state of rest for the full period of the two successive printings which comprise the composite image.

7. The method of printing by projection, from a color selected negative film, in registry upon a continuous length of a motion picture film, composite projection positive images, each image comprising one image of one color selection registering with its perforations in superposed relation with another image of another color selection, comprising as steps, registering a negative film by means of four positioning pilot pins at the negative printing aperture engaging the radially outward edges of four perforations at the four corners of the negative image area, registering a double coated film sensitized on both sides at the positive printing aperture, printing an image upon the positive from the negative, advancing the negative while holding the positive fixedly clamped at the positive printing aperture, and again registering the negative film by means of the four pilot pins and printing a second image upon the positive in congruent relation to the first printed image.

8. The method of printing by projection, from a color selected negative film, in registry upon a continuous length of a motion picture film, composite projection positive images, each image comprising one image of one color selection registering with its perforations in superposed relation with another image of another color selection, comprising as steps, registering a negative film by means of four positioning pilot pins at the negative printing aperture engaging the radially outward edges of four perforations at the four corners of the negative image area, registering a double coated film sensitized on both sides at the positive printing aperture by means of four pilot pins, printing an image upon the positive from the negative, advancing the negative while holding the positive clamped, and positioned by the four pins in a state of rest relative to the film gate at the positive printing aperture and again registering the negative film by means of the four pilot pins and printing a second image upon the positive in congruent relation to the first printed image.

9. The step in printing a motion picture projecting positive, which consists of registering the negative film at the negative printing aperture by means of four pilot pins engaging the radially outward edges of four perforations at the four corners of the negative image area at the aperture and registering a positive by means of four relatively larger pilot pins engaging the radially outward edges of four perforations at the four corners of the positive image area at the aperture and printing from the negative upon the positive.

In testimony whereof, I have signed my name to this specification this 30th day of April, 1921.

JOSEPH SHAW.